Aug. 15, 1950     R. L. GUENTNER ET AL     2,518,884
X-RAY STEREOSHIFT MECHANISM

Filed Dec. 11, 1947     2 Sheets-Sheet 1

INVENTORS
R. L. GUENTNER
R. L. WRIGHT
BY
ATTORNEY

Aug. 15, 1950   R. L. GUENTNER ET AL   2,518,884
X-RAY STEREOSHIFT MECHANISM
Filed Dec. 11, 1947   2 Sheets-Sheet 2
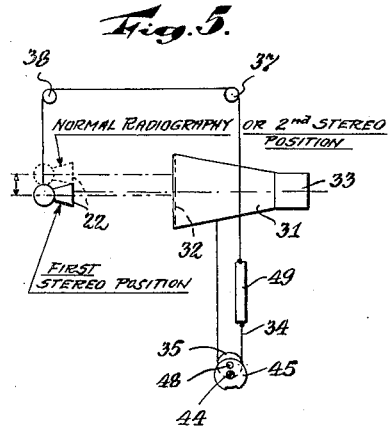
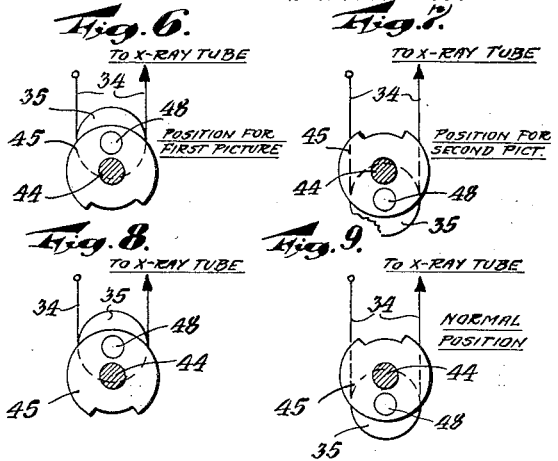
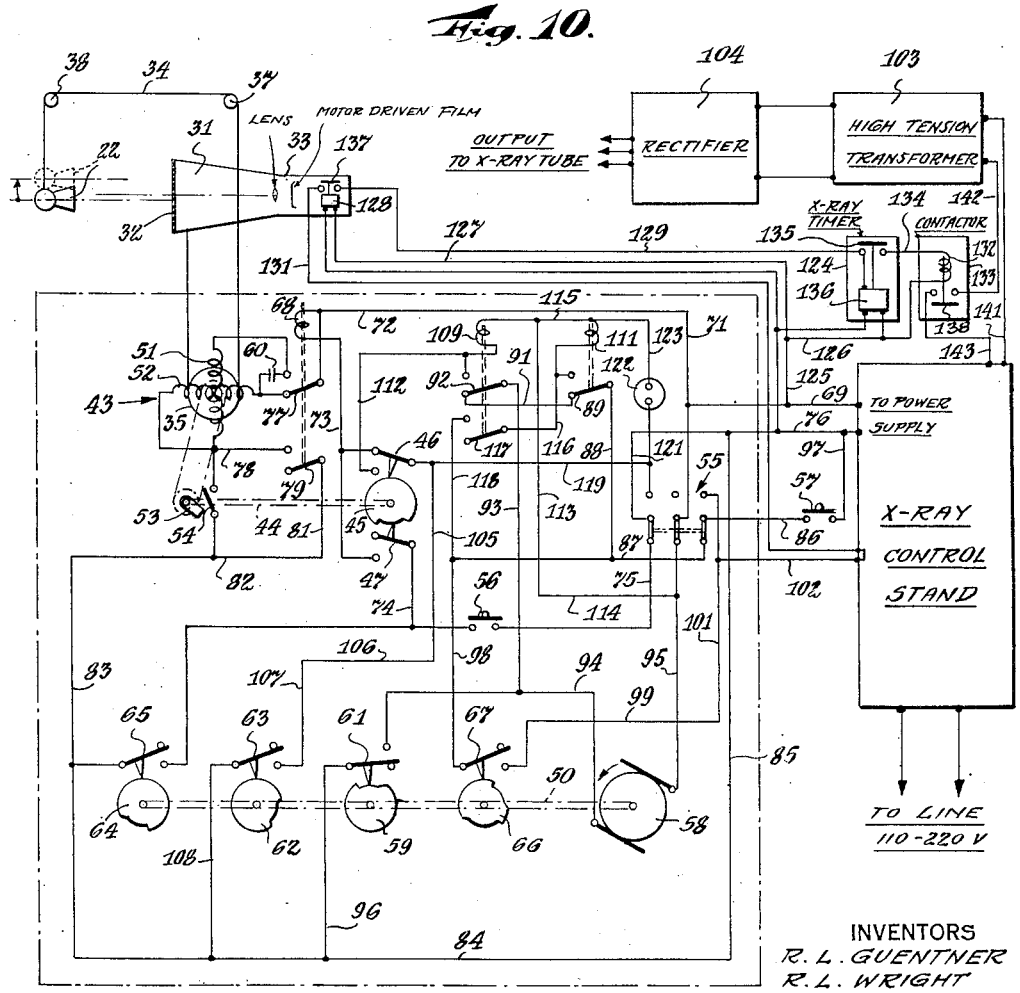
INVENTORS
R. L. GUENTNER
R. L. WRIGHT
BY 
ATTORNEY Patented Aug. 15, 1950

2,518,884

UNITED STATES PATENT OFFICE 2,518,884

X-RAY STEREOSHIFT MECHANISM

Robert L. Guentner, Baltimore, and Robert L. Wright, Severna Park, Md., assignors to Westinghouse Electric Corporation, East Pittsburgh, Pa., a corporation of Pennsylvania Application December 11, 1947, Serial No. 791,134

13 Claims. (Cl. 250—65)

1

This invention relates to X-ray photofluorography and more particularly to mechanism for automatically operating X-ray apparatus to take a pair of stereoscopic pictures.

The principal object of our invention, generally considered, is to provide apparatus which, upon pushing a control bar energizes an X-ray tube and operates a camera to take a photograph in "stereo" tube position, cuts off the power to said X-ray tube, moves it to the normal tube position, energizes said tube in the normal position and operates said camera to take another photograph in stereoscopic relationship with respect to the first photograph, and then automatically deenergizes said tube and returns it to "stereo" position ready for taking another photograph.

Another object of our invention is to provide means to accurately move the X-ray tube from one position to another without overrunning.

A further object of our invention is to provide a friction arm on the stereo motor to hold in a switch which supplies power to said motor, so that reversing of the motor is necessary to cause the arm to back off its switch and cut off the motor power.

Other objects and advantages of the invention, relating to the particular arrangement and construction of various parts, will become apparent as the description proceeds.

Referring to the drawing:

Figure 5 is a diagrammatic view illustrating how the X-ray tube may be moved from one position to the other, without changing the position of the camera, hood, and fluorescent screen, a distance equal to twice the movement of the position cam pulley.

Figure 6 is a view corresponding to Figure 3, but showing the relative position of the stereoshift or position cam and pulley when the parts

2 are in position for taking a photograph from the first stereo position.

Figure 7 is a view corresponding to Figure 6, but showing the parts, after rotating 180°, reversed in position for a photograph from the normal or second stereo position.

Figure 8 is a view corresponding to Figure 7, but showing the next position where the X-ray tube has been moved down to initial stereo picture-taking position.

Figure 9 is a view corresponding to Figure 8, but showing the position where the tube has been moved back to position for "normal" photofluorography or radiography.

Figure 10 is a diagrammatic view and wiring diagram for operating the mechanism of the preceding figures, with the parts in position just prior to a stereo sequence.

In the Wagner application, Serial No. 747,253, filed May 10, 1947, now Patent No. 2,492,339 and owned by the assignee of the present application, there is described and claimed photofluorographic apparatus wherein parts simultaneously move to maintain the alignment of the X-ray tube with the fluoroscopic screen, photographic hood and camera, while said apparatus is set for taking a single photograph from a fixed position at a selected elevation. In accordance with the present invention there is provided apparatus which may be used with such photofluorographic apparatus or other X-ray apparatus in order to secure additional advantages as will now be explained.

In addition to taking a photograph from a fixed position, it is frequently desirable to almost instantly thereafter take another from a slightly different angle or from a position spaced a short distance from that from which the first photograph was taken, so as to take advantage of the stereoscopic effect. It is also desirable that these photographs be taken automatically after an initial actuation of apparatus, as by pushing a button, so that without further attention, the X-ray tube, after if necessary moving to a "first stereo" position, is activated, the first photograph taken, the X-ray tube shut off and moved to a "second stereo" position, where it is again activated, a second photograph taken, and the X-ray tube again shut off and moved back to the first position preparatory to taking another pair of photographs when desired. It is also desirable that this stereo apparatus be adapted for application to and removal from apparatus for taking pictures by normal photofluorography, such as described and claimed in said Wagner application, above referred to. The timing of the exposures may be by any method. One method is disclosed in the Zavales et al. application, Serial No. 673,748, filed June 1, 1946, and owned by the assignee of the present application. We will now describe a preferred embodiment of our invention.

Figure 1:
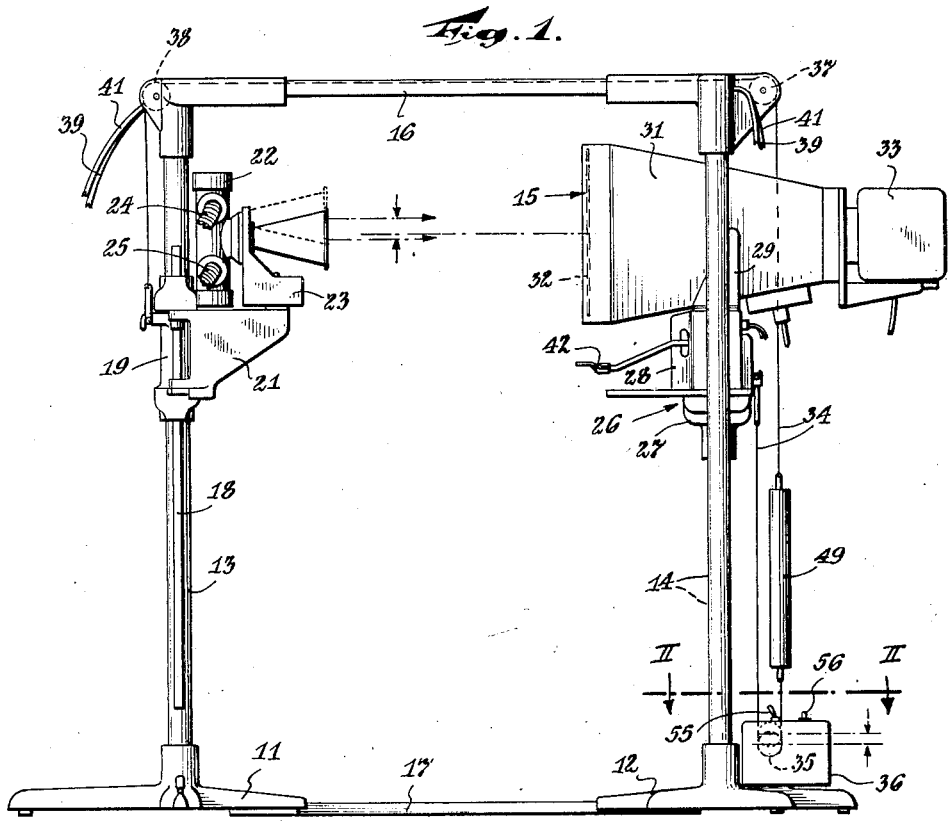
Figure 1 is an elevational view of apparatus embodying our invention.

Referring to the drawing in detail, like parts being designated by like reference characters, there is shown in Figure 1, apparatus comprising a pair of base members 11 and 12, one of which supports an upright or tubular column 13 and the other a pair of uprights or columns 14, shown one behind the other, between which is mounted photofluorographic apparatus 15 comprising a camera, hood and fluorescent screen. A channel tie bar 16 interconnects the columns 13 and 14 at the top and a similar tie bar 17 interconnects the bases 11 and 12 at the floor line, to position the apparatus carried by the respective columns a predetermined distance apart. Suitable means may be provided to allow for ready assembly and disassembly of the apparatus and for leveling the apparatus with respect to the floor.

The column 13 is provided with a track 18 on which a collar or the like 19 is arranged to move. Pivotally secured to the collar 19 is a bracket 21, while an X-ray tube and housing 22 is in turn pivotally connected to the bracket 21 as by an auxiliary bracket 23. This arrangement allows for both horizontal and vertical adjustment of the X-ray tube which receives operating electrical energy through a pair of high voltage cables 24 and 25 extending to a source of power (not shown) which may include apparatus controlling the timing of the exposure as disclosed in the Zavales application referred to.

A photofluorographic carriage 26 is arranged to move vertically and disposed between the columns 14. It comprises a collar 27 provided with suitable rollers engageable with tracks extending longitudinally of one of the columns 14. Secured to the collar 27 or formed integrally therewith is a housing portion 28 which is likewise provided with rollers engageable with a track extending longitudinally of the other column 14, all of said construction being desirably as described in the Wagner application referred to. A pair of upright brackets 29 are secured to the top of the housing portion 28. A photographic hood 31 is secured to these brackets and provided with a fluorescent screen 32 at its large end nearest the X-ray tube, and a motor-driven motion-picture-type camera 33 at its other end.

An electric motor (not shown) is mounted within the housing 28 and through reduction gearing and a sprocket chain serves as driving mechanism to simultaneously move the picture-taking apparatus 15 up or down with the X-ray tube 22 as desired, and preferably as described in the Wagner application referred to. In order to allow for simultaneous up-or-down movement of the X-ray tube and picture-taking equipment, a cable or chain 34, forming a connecting line has one end secured to the collar 27 of the carriage 26, and passes downwardly around a pulley or gear 35 carried by a "stereo" housing 36 mounted on the base 12, then around a similar pulley or gear 37 at the top of the columns 14, across interiorly of the channel 16, around a pulley or gear 38 carried at the top of the column 13, and with its opposite end connected to the X-ray tube carriage collar 19. Accordingly, as the photofluorographic apparatus is moved upwardly or downwardly, the X-ray tube carriage moves simultaneously therewith in the same direction, to maintain the axis of the X-ray beam in desired relation parallel to the horizontal axis of the hood 31, and hence in desired relation with respect to the screen 32 and film within the camera 33, except at times when it is desired to take a stereoscopic picture from an off-set position, as will be described.

For the purpose of supplying electrical energy to the electric motor in the housing 28, as well as controlling the motor of the camera 33 from the usual control stand, cables 39 and 41 extend along the channel 16 with sufficient slack to allow ample movement of the photofluorographic carriage 26 without placing an extra strain thereon. The drive motor for the carriage is desirably controlled by operation of a drum switch disposed interiorly of the housing 28, as described in the Wagner application before referred to, to cause upward or downward movement of the apparatus by corresponding rotation of said motor by pressing the operating lever 42 upwardly or downwardly as described in said Wagner application.

In order to allow for not only taking a picture of an object when the X-ray tube 22 is positioned a small distance, two inches for example, above the horizontal centerline of the photographic apparatus 15, as shown in dotted lines in Figures 1, 5, and 10, but also for taking a picture of the same object from a stereoscopic position when the X-ray tube is placed a small distance, ½ inch for example, below, as shown in full lines in said figures, we provide apparatus enclosed in the housing 36 and comprising a so-called "stereo" induction motor 43. The motor 43 is desirably a 3-wire capacitor type with a double reduction built-in worm and gear assembly. In the shaft 44 of the rotor of the motor is mounted a "stereo shift" or position cam 45, associated with an "up limit" switch 46 and a "down limit" switch 47. On a pivot portion of the position cam, off-set from the axis of shaft 44, or on a crank 48 offset from said shaft, is mounted the pulley or gear 35 over which the cable or chain 34 passes. This means that rotation of the shaft 44, independent of any other movement, causes corresponding movement of the X-ray tube 22 between the position indicated by the arrows of Figure 1.

Figure 3:
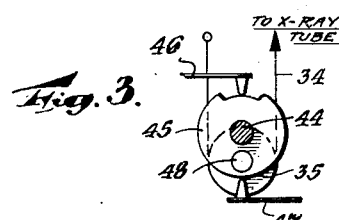
Figure 3 is a fragmentary sectional view on the line III—III of Figure 2, in the direction of the arrows, showing the stereoshift or position cam, associated pulley, and switches in normal position.

In order to employ a small "stereo" motor 43, the weight of the X-ray tube and associated apparatus is neutralized, at least to some extent, by counterweight 49 forming part of or mounted on the cable or chain 34. It will thus be understood that when the "stereo" motor turns the cam from the normal position illustrated in Figure 3 to that of Figures 5, 6, and 8, the X-ray tube is moved from the position for normal photofluorography, which is also called the "second stereo" position, downwardly from the dotted line position to the full line position, as illustrated in Figure 5.

Figure 4:
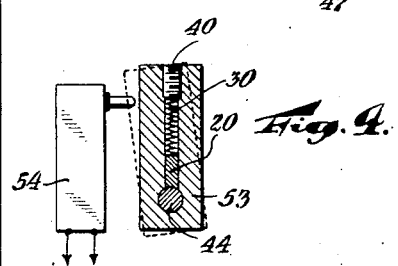
Figure 4 is a fragmentary sectional view on the line IV—IV of Figure 2, in the direction of the arrows, showing the motor-control arm and associated switch.

To prevent overrunning of the "stereo" motor 43, we provide it with field windings 51 and 52 and a phase-shifting or splitting condenser 60, for not only causing movement in one direction to raise or lower the X-ray tube, but also a reverse or braking force when the phase shifting condenser is transferred from a series relationship to one winding, to such with respect to the other, for checking the turning of the motor and effecting a breaking of the circuit thereto, when the desired position of the X-ray tube has been reached. A motor-control or "friction" arm 53 is mounted on the shaft 44, as shown in Figure 4, so that immediately the motor starts to move, a switch 54 is closed and remains closed until the motor 43 is reversed, whereupon the friction arm 53 is backed away, or moved from the dotted to the full line position illustrated in Figure 4, causing the switch 54 to open and the power to be disconnected from the motor. The frictional drive of said arm 53 may be maintained by having it carry a sliding shoe member 20 resiliently pressed against the shaft 44 by a spring 30 held under adjusted pressure by follower 40 threaded into said arm.

To move cam 45 and the X-ray tube from "normal" or "up" position to first stereo or "down" position, the three pole toggle switch 55 is put in the "down" position as shown in Figure 10, and the "preset" button 56 depressed. This provides power for the stereo motor 43, causing it to go one half revolution and stop. The circuit is then, as shown in Figure 10, ready to begin taking stereo sequences.

To start a sequence, depress the manual circuit closer or "push bar" 57, which may correspond with the exposure switch 106 of the Zavales et al. application referred to, to cause the apparatus described to automatically go through the desired picture-taking cycle. We have provided a timer motor 58 to drive a shaft 50 on which it mounted a series of cams forming with associated switches a sequence timer, means being provided so that once operated the cams will be turned a complete revolution and returned to initial position.

Figure 2:
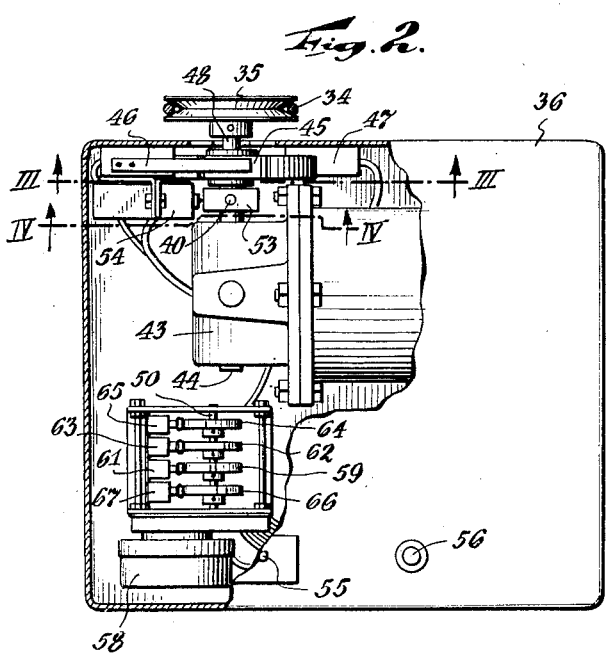
Figure 2 is a plan of the stereoshift automatic unit which, complete with motor and control system, may be attached directly to the base of the apparatus of Figure 1, with parts of the housing broken away to more clearly show the interior.

The motor 58 is shown in plan in Figure 2 with its associated cams and switches and diagrammatically in Figure 10. From Figure 10, it will be seen that there are four cams; that numbered 59 and its associated switch 61 serving to provide a holding circuit to keep the motor 58 running after being started, even if the push bar 57 is released; a cam 62 and switch 63 serving to restart the stereo motor 43 to move the X-ray tube up or from "first stereo" position to "second stereo" position; a cam 64 and associated switch 65 to move the tube down or from "normal" or "second stereo" position to "first stereo" position; and a cam 66 and switch 67 to control the high voltage power, energizing and deenergizing the X-ray tube and moving the film in the camera 33 after exposure thereof, for taking the two pictures, that is one from each of the "stereo" positions above referred to.

The cams desirably have a contour substantially as illustrated in Figure 10 and are so disposed on the shaft 50 and their low dwells are of such lengths, that the sequence of operation of the respective switches is as follows. (1) Switch 61 is moved to close a circuit; (2) switch 67 is released to close a circuit; (3) switch 67 is moved to open its circuit; (4) switch 63 is released to close a circuit; (5) switch 63 is moved to open its circuit; (6) switch 67 is again released to close its circuit; (7) switch 65 is released to close a circuit; (8) switch 67 is again moved to open its circuit; (9) switch 65 is moved to open its circuit; and (10) switch 61 is released to open its circuit. As illustrated the low dwell of cam 59 has a length of about 30°, those of cams 62 and 64 lengths of about 65°, while cam 66 has one low dwell about 65° long and one about 130° long, separated by about 75°.

Referring now to the wiring diagram of Figure 10 and assuming that the X-ray tube 22 is in upper or normal position, the toggle switch 55 to set for "stereo" is moved down to that position, as indicated, and the "preset" push button 56 depressed. This energizes the stereo motor switch solenoid 68 from power line 69 through lines 71 and 72 and back through line 73, down limit switch 47 of cam 45, line 74, "preset" button 56, line 75, and toggle switch 55 to power line 76. The stereo motor 43 has its winding 51 energized directly, and its winding 52 energized in series with the phase-shifting condenser 60, from line 72 through upper switch 77 when in upper position, the return being through line 78, lower solenoid control switch 79 in its up position, lines 81, 82, 83, 84, and 85, back to power line 76, causing the motor to turn one half revolution and move the X-ray tube from normal position illustrated in dotted lines down to first stereo position illustrated in full lines in Figures 5 and 10.

This movement of the motor turns the cam 45 to the position illustrated in Figures 5, 6, and 10 where the switch 47 is opened, thereby deenergizing the solenoid 68 and allowing the switches 77 and 79, controlled thereby, to drop. This movement of the switches momentarily reverses the motor by energizing its winding 52 directly from line 72 through switch 77 in lower position, and its winding 51 in series with said condenser 60. The circuit is completed through switch 54, which was closed by friction arm 53 on the motor 43 upon its being initially started, and back to the power line 76 through lines 83, 84, and 85. This reversal of the motor, however, causes the friction arm 53 to immediately back away from and allow the switch 54 to open, thereby insuring that the motor is stopped at the desired position.

After moving X-ray tube down to the "first stereo" position, as above described, the push bar 57 is depressed by the operator to start the motor 58 for driving the sequence timing cams for one complete revolution. The circuit for this operation is from power line 76 through line 97, push bar 57, line 86, toggle switch 55, lines 87 and 88, solenoid-controlled switch 89 in down or released position, line 91, solenoid-controlled switch 92 in down or released position, lines 93 and 94, through motor, and back through line 95, toggle switch 55, and line 71 to power line 69.

Turning of the sequence timer cams closes the switch 61 of cam 59, and establishes a holding circuit for the motor, as well as energizing the X-ray tube for the first stereo position picture by closing switch 67 of cam 66. The holding circuit for the motor is from power line 69 through line 71, toggle switch 55, line 95, motor 58, line 94, switch 61, and lines 96, 84, and 85, to power line 76. The X-ray control circuit is from power line 76, through line 97, push bar 57, line 86, toggle switch 55, line 87, line 98, switch 67, and lines 99, 101 and 102 to starting connection on X-ray control stand. The establishment of this circuit connects the output from the high-tension transformer 103 and rectifier 104 to the X-ray tube 22 for taking the first stereo position picture. This X-ray control circuit is maintained after initiation, even if the push bar 57 is released, by a holding circuit from line 76, through lines 85, 84, 96, switch 61, lines 94, 93, switch 92, line 91, switch 89, and from there through lines 88 and 87 to same starting connection on X-ray control stand. Further turning of the cam 66 opens the switch 67 and cuts off the power to the X-ray tube 22. The camera movements are synchronized with the X-ray exposures by the control stand in the case of a motor driven camera; by the female connector 122 in the case of a solenoid-operated camera; or by hand for a manual camera.

The camera and exposure of the film therein may be controlled in the following manner. The reference character 124 designates an X-ray timer, which may be of known construction, receiving power from line 69 through lines 125 and 126. Line 126 is extended and through line 127 connects with film-actuating mechanism 128 in the camera 33. The X-ray timer 124 is also connected through line 129 to a contact used in connection with the film actuating mechanism which, when the latter is energized, is connected to another contact closing a circuit through line 131 to the connection of line 102 in X-ray control stand. The line 126 also connects with one terminal of the solenoid 132 in contactor 133, the other terminal of which is connected through line 134 to a contact in the X-ray timer 124, which in turn is connected to line 129 by bridging conductor 135 upon energization of the timer mechanism 136.

It will thus been seen that power passes from lines 69, 76, and 97 to the control apparatus. From line 69 it passes along lines 125, 126, and 127 to timer, camera, contactor mechanisms, and back on line 76. Power from line 97 passes through push bar 57, switch 67, lines 99, 101, 102 and 131 to a contact in the camera. The camera is triggered through its mechanism 128 to close its switch 137, move the film therein; and allow power to pass out through line 129 to timer mechanism 136, causing contactor 135 to close and start its automatic sequence. The timer then controls the duration of the X-rays. The actual power for the X-ray flows through a heavy duty solenoid contactor switch 138, in contactor 133, thereby energizing transformer primary 103 through lines 141, 142, and 143 from X-ray control stand. The contactor and part of the timer may be inside the control stand or separate therefrom, as desired.

The stereo motor 43 is given another half turn to move the cam 45 to the position of Figure 7 upon "restarting" cam 62 reaching the position where it closes switch 63. The circuit controlled thereby is from power line 69 through lines 71 and 72 to solenoid 68, raising switches 77 and 79. From the solenoid 68 the circuit goes through line 73, up limit switch 46, lines 105, 106, and 107, switch 63, and to power line 76 through lines 108, 84, and 85. The motor 43 is energized from line 72 through switch 77 in "up" position, the return circuit being through line 78, switch 79, and lines 81, 82, 83, 84, and 85 to power line 78, thereby causing the friction arm 53 on the motor output shaft to immediately close the "plugging" switch 54 which parallels the circuit through the switch 79.

Upon the cam 45 reaching the position of Figure 7, the circuit to the solenoid 68 is broken, allowing the switches 77 and 79 to drop, energizing the motor momentarily through switch 54 until that opens upon the motor starting to reverse. With the cam 45 in the position of Figure 7, solenoids 109 and 111 are energized, raising their switches, whereby a circuit is established from line 84 through line 108, switch 63, lines 107, 106, 105, "up limit" switch 46, line 112, switch 92, in "up" position, lines 93, 94, motor 58, and back to power line 69 through line 95, toggle switch 55 and line 71.

The upper switch of solenoid 109 causes it to lock to power line 76 through lines 85, 84, 96, switch 61, lines 94, 93, switch 92, and from solenoid 109, back through lines 113 and 114, in parallel with the motor 58 to power line 69. The lower switch 117 of solenoid 109 energizes solenoid 111 from power line 69 through lines 71, toggle switch 55, line 95, 114, 113, 115 and back through line 116, switch 117, lines 118, 87, toggle switch 55, line 86, push bar 57, and line 97 to power line 76, raising switch 89 and breaking circuit used for initiating a cycle and that for maintaining the X-ray control circuit. These solenoids 109 and 111 are for breaking the original push-bar source of timer power, and causing the timer motor 58 to draw power from line 76 through its own interlock switch 61.

The X-ray tube 22 is in the second stereo position, when the switch 67 is closed the second time and the switch 63 opened upon further turning of the cams. The second exposure is initiated, providing the push bar 57 is depressed. The circuit is from power line 76 through line 97, push bar 57, line 86, toggle switch 55, lines 87 and 88, switch 67, and lines 99, 101 and 102 to starting connection of X-ray control stand. After the maximum expected exposure time, switch 67 is opened by cam 66, cutting off power to the X-ray tube, while cam switch 65 closes circuit through "down limit" switch 47, energizing solenoid 68 and windings 51 and 52 of motor 43, and starting operation thereof to move cam 45 to position of Figure 8 and lower the X-ray tube 22, and then is opened. The motor 43 is stopped, as in the preceding case, after one half revolution. The camera movements are synchronized with the X-ray exposures by the control stand in the case of a motor driven camera; or by the female connector 122 in the case of a solenoid-operated camera; or by hand for a manual camera, as in the previous instance. The cam switch 61 opens, deenergizing the solenoid 109, and breaking the holding circuit to and stopping the timing motor 58. The solenoid 111, however, remains locked to the main control until release of the push bar 57 completes the sequence, with the X-ray tube in lower position.

Reviewing the operation of the aforedescribed mechanism, it is pointed out that if the parts are in "normal" position, they are moved to first "stereo" position by moving toggle switch 55 down to the position of Figure 10 and pushing the preset button 56. Holding down the preset button establishes a circuit through solenoid 68, causing its controlled switches 77 and 79 to establish a circuit through motor 43, causing it to run in its forward direction and establish a circuit through switch 54, paralleling that through switch 79, until the cam 45 moves switch 47 and cuts off power from the solenoid 68, by moving to the position shown in Figure 10. Switches 77 and 79, upon being released, establish a circuit in which the condenser 60 is transferred from series relationship with winding 52 to that with winding 51, causing momentary reversal of the motor, opening switch 54, stopping all action, and leaving the circuit as in Figure 10 ready for a "stereo" sequence.

To start a "stereo" sequence, push bar 57 is depressed, initiating a circuit through the timer motor 58 and switches 92 and 89 in their lower positions. The timer motor then gets power through its holding circuit cam switch 61, and must thus run for one complete revolution. After the first exposure, the motor 43 runs one half revolution and stops. Immediately the solenoid 109 gets power through "up limit" switch 46 for an instant before cam 62 cuts the power off by opening its switch 63. However, as soon as solenoid 109 gets this power, it connects itself to a holding circuit from its switch 92 in up position, and it must remain energized until the holding cam 59 ends the sequence, even though "up limit" switch 46 opens the original source of power to solenoid 109.

Energizing the solenoid 109 causes energizing of the solenoid 111 with power through push bar 57 and switch 117 of solenoid 109. Solenoid 111 then pulls up its switch 89, establishing a circuit paralleling that through switch 117.

After making the second exposure, the stereo motor 43 moves the tube down to first "stereo" position, opening circuit to solenoid 109. Holding circuit cam 59 returns to its original position, opening circuit to timer motor 58, and cutting off power to solenoid 109. The timer motor stops and the solenoid 109 releases its switches 92 and 117, allowing them to revert to their normal down positions.

However, if the push bar 57 is still depressed, the solenoid 111 is kept energized and the "up" position of its switch 89 prevents reestablishment of the initial power circuit to the timer motor 58 through said push bar, thus preventing recycling or the starting of a new timer motor operation. Switch 89 thus prevents reestablishment of the sequence until the push bar 57 is released without, of course, preventing the starting of a sequence immediately, if desired, by redepressing said push bar.

In order to raise the tube, the toggle switch 55 is thrown to upper or normal position, energizing solenoid 68 from line 72, through line 73, "up limit" switch 46, line 119, toggle switch 55 and line 121 to power line 76. This energizes the windings 51 and 52 of motor 43 through switch 77 in "up" position, as in the preceding instance and causes the cam 45 to move to the position of Figure 9, raising the X-ray tube 22 to upper or normal position.

A female two pole connector 122 is provided in line 123 to allow for a surge of power between exposures in case a hand-wound camera with a magnetic film changer is used. The toggle switch 55 is set to "stereo" and, while the motor 58 is running, current from power line 76 is brought through lines 85, 84, 108, switch 63, lines 107, 106, 105, and 119. Since in this circuit no connection is available which will provide power only between exposures, the connector receives power through switch 65 and down limit switch 47 during the second period of motor operation. The expected activity of hand-wound cameras with apparatus of this character is not large, however, and the extra operation of the camera solenoid is not expected to be objectionable.

From the foregoing disclosure it will be seen that we have provided apparatus which may be used with other known apparatus in order to adapt it for automatically taking a picture in one position and, shortly thereafter, one in stereo relationship with respect to the first picture, using only one camera and one X-ray tube, while attaining in practical effect the advantages which could be obtained if two cameras in stereoscopic relationship simultaneously took pictures of an object.

Operation of the unit is completely automatic. Initially the X-ray tube is desirably a small distance, such as one half inch below the center line of the camera hood. When the push bar is depressed, the first "stereo" exposure is made, and the tube shifts upward a distance, such as 2½". The second exposure is made, and the tube returns to its initial position ready for the next patient. Since normal photofluorography is done with the tube in its upper position, a toggle switch is provided to move the tube to that position. Return to "stereo" is accomplished with the same toggle switch and a preset push button.

A timer receives an initial surge of power upon depressing the control push bar, goes through one revolution, and stops. By its cam-switch arrangement, when an exposure is made, the timer sends power to the control, which in turn properly activates the tube. The timer also supplies power to the motor through relays and limit switches.

The "stereo" motor drives a pulley mounted on a cam crank. The pulley shifts the tube by pulling the interconnecting chain to which the tubehead carriage is attached. Since it is of a type instantly reversible, it may be stopped by "plugging," that is reversing the windings and then cutting off the power. Three relays controlled by three limit switches and the timer produces the automatic control of the unit. The up and down limit switches are in series with timer switches and the motor is in series with the plugging switch. When the motor is run, a timer switch energizes a relay, shorting out the normally open plugging switch and starting the motor.

When a limit switch falls out, it deenergizes a relay, reversing the motor connections and forcing the motor to draw its power through the plugging switch. The motor reverses momentarily, until the plugging arm backs off the plugging switch and breaks the circuit, effecting quick stoppage. The arrangement is such that the timer runs, upon removing the original push bar source of power, through its own interlock, and stops running at the end of one sequence.

Power used to initiate X-ray exposures enters the "stereo" mechanism from the control push bar, and leaves through a timer switch. If the control push bar is released after the sequence begins, the first exposure takes place, using power through the timer switch and relays. Thus the first exposure will always be made. The second, however, due to the energizing of relays, will only be made if the push bar is held down until the tube starts to drop to its initial position.

Although a preferred embodiment of our invention has been disclosed, it will be understood that modifications may be made within the spirit and scope of the appended claims.

We claim:

1. Apparatus for taking stereo photofluorographic pictures, comprising means including a connecting chain mounting an X-ray tube and picture-taking equipment in such relationship that both may be moved up or down together, in accordance with the elevation at which it is desired to take such pictures, and apparatus for automatically changing the relative elevation of said X-ray tube and picture-taking equipment, comprising a shaft, a crank on said shaft, a pulley mounted on said crank and over which said connecting chain passes, a motor for driving said shaft, and control mechanism for said motor to cause it to oscillate said shaft to, between the taking of stereoscopic pictures, move said pulley from one extreme elevational position to the other to effect an elevational movement of the X-ray tube of double the pulley movement.

2. Apparatus for taking stereo photofluorographic pictures, comprising means including a connecting chain mounting an X-ray tube and picture-taking equipment in such relationship that both may be moved up or down together, and apparatus for automatically changing the relative elevation of said X-ray tube and picture taking equipment comprising a shaft, a crank on said shaft, a pulley mounted on said crank and over which said connecting chain passes, a cam also mounted on the shaft, a motor for driving said shaft, and a sequence timer connected to control said motor and cause it when energized to turn the cam 180° and move said pulley from one extreme elevational position to the other to effect an elevational movement of the X-ray tube of double the pulley movement between operations of said X-ray tube and picture-taking equipment.

3. Apparatus for taking stereo photofluorographic pictures, comprising means including a connecting chain mounting an X-ray tube and picture-taking equipment including film-advancing mechanism in such relationship that both may be moved up or down together, in accordance with the elevation at which it is desired to take such pictures, and apparatus for automatically changing the relative elevation of said X-ray tube and picture-taking equipment, comprising a shaft a crank on said shaft, a pulley mounted on said crank and over which said connecting chain passes, a cam also mounted on the shaft, a motor for driving said shaft, and a sequence timer connected to control said motor and cause it when energized to turn the cam 180° and effect the operation of said X-ray tube and picture-taking equipment, said timer comprising a shaft, a motor for driving said shaft, a plurality of cams on said shaft, switches respectively controlled by said cams, one of said switches serving to establish a holding circuit to insure that the timer motor rotates through an entire sequence after initial actuation, a second switch serving to cause the X-ray tube to move from initial to a second picture-taking position, a third switch effecting movement of said tube back to initial picture-taking position, and a fourth switch controlling the power supply to the X-ray tube, whereby said X-ray tube may be energized and the picture-taking equipment operated while in one position, then shut off and the film in said picture-taking equipment moved one frame, said motor then energized to turn said cam and the crank-carried pulley, moving said X-ray tube to another position, said tube reenergized, the picture-taking equipment operated in said other position, the power to said tube cut off, the film in said equipment moved another frame, and the motor then moving the X-ray tube back to the first position; preparatory to repeating the program.

4. Apparatus for taking stereo photofluorographic pictures comprising means for changing the relative positions of an associated X-ray tube and picture-taking equipment, and a sequence timer controlling the movement of said apparatus comprising a shaft, a motor for driving said shaft, a plurality of cams on said shaft, switches respectively controlled by said cams, one of said switches serving to establish a holding circuit to insure that the motor rotates through an entire sequence after initial actuation, a second switch serving to cause the X-ray tube to move from initial to a second picture-taking position, a third switch effecting movement of said tube back to initial picture-taking position, and a fourth switch controlling the power supply to the X-ray tube, whereby, after the start of a cycle, said cams close the fourth and first switches to energize the X-ray tube and establish a holding circuit for the motor, then open the fourth switch, then close the second switch to effect movement of the X-ray tube to said second position, then close the fourth switch for the second time and open the second switch, then close the third switch to move the X-ray tube back to initial position and again open the fourth switch, then open the third switch, and finally open the first switch preparatory to starting a new cycle.

5. Apparatus for taking stereo photofluorographic pictures comprising means for changing the relative positions of an associated X-ray tube and picture-taking equipment, and a sequence timer controlling the movement of said apparatus, comprising a shaft, a motor for driving said shaft, a push bar for initiating a power circuit to said motor including, a switch in its released position, a second switch, a first solenoid for when energized moving said switches and breaking said circuit, a plurality of cams on said shaft, switches respectively controlled by said cams, one of said switches serving to establish a holding circuit to insure that the timer motor rotates through an entire sequence after initial actuation, a second switch serving to cause the X-ray tube to move from initial to a second picture-taking position, a second solenoid in the circuit with second of said solenoid-moved switches, a two position switch which in its released position is in said power circuit with said first solenoid switch and is moved upon energization of said second solenoid to prevent reestablishment of the initial actuating power circuit through said push bar and starting of a new sequence-timer operation until release and redepression of said push bar, a third switch effecting movement of said tube back to initial picture-taking position, and a fourth switch controlling the power supply to the X-ray tube, said cams being arranged and constructed to, after the start of a cycle, close the fourth and first switches to energize the X-ray tube and establish a holding circuit for the motor, then open the fourth switch, then close the second switch to effect movement of the X-ray tube to said second position, then close fourth switch for the second time and open the second switch, then close the third switch to move the X-ray tube back to initial position and again open the fourth switch, then open the third switch, and finally open the first switch preparatory to starting a new cycle, whereby after a first stereo exposure the tube shifts upward, a second exposure is made, and the tube returns to its initial position ready for the next patient.

6. In apparatus for taking stereo photofluorographic pictures, means for changing the relative positions of an associated X-ray tube and picture-taking equipment, a sequence timer controlling the movement of said apparatus comprising a motor, a push bar for initiating a power circuit to said motor, including a switch in its released position, a second switch, a first solenoid for when energized moving said switches and breaking said circuit, a plurality of cams turned by said motor, control switches respectively opened and closed by said cams, and means to prevent the motor from continuously turning the cams through more than one cycle in case the push bar is continuously held down, comprising a second solenoid in the circuit with the second of the first solenoid-moved switches, and a two-position switch which in its released position is in said power circuit to the motor with said first solenoid switch and is moved upon energization of said second solenoid to prevent reestablishment of the initial actuating power circuit to said motor through said push bar.

7. In apparatus for taking stereo photofluorographic pictures, a motor for moving an X-ray tube from one stereoscopic position to another, said motor having field coils and a phase-shifting reversing condenser associated therewith, a solenoid-controlled switch to change the relationship between said condenser and coils, a friction arm carried on said motor shaft, and a switch controlled by said arm, whereby upon the motor turning through 180°, the condenser relationship is changed, starting a momentary reverse motor movement and retraction of the friction arm to open the circuit and deenergize said motor, thereby avoiding motor overrunning and insuring that the X-ray tube is moved the distance desired.

8. Apparatus for taking stereo photofluorographic pictures, comprising a pair of base members one of which supports a single column and the other a pair of columns, an X-ray tube mounted on said single column, photofluorographic apparatus mounted between the columns of said second base member and comprising a camera, a motor therein, a film driven by said motor for periodically changing frames, a hood and a fluorescent screen, means including a chain connecting said X-ray tube and photofluorographic apparatus, means operating through said chain for moving said X-ray tube and photofluorographic apparatus up or down together, in accordance with the elevation at which pictures are to be taken, a motor and operated shaft for moving said X-ray tube from one stereoscopic position to another, and a pulley carried by said shaft and rotatable on an axis offset from the shaft axis, and over which said chain passes, whereby turning of the shaft 180°, when the pulley is in extreme down or up position, moves the pulley up or down and effects an opposite movement of the X-ray tube of double the distance.

9. Apparatus for taking stereo photofluorographic pictures, comprising a pair of base members one of which supports a single column and the other a pair of columns, an X-ray tube mounted on said single column, photofluorographic apparatus mounted between the columns of said second base member and comprising a camera, a motor therein, a film driven by said motor for periodically changing frames, a hood and a fluorescent screen, means including a chain connecting said X-ray tube and photofluorographic apparatus, means operating through said chain for moving said X-ray tube and photofluorographic apparatus up or down together, in accordance with the elevation at which pictures are to be taken, a motor and operated shaft for moving said X-ray tube from one stereoscopic position to another, a pulley carried by said shaft and rotatable on an axis offset from the shaft axis, and over which said chain passes, whereby turning of the shaft 180°, when the pulley is in extreme down or up position, moves the pulley up or down and effects an opposite movement of the X-ray tube of double the distance, said motor having field coils, a condenser associated therewith, a switch controlled to change the relationship between said condenser and coils, a friction arm carried on the motor shaft, and a switch controlled by said arm, whereby upon starting the motor said switch is closed to establish a motor-operating holding circuit, and upon turning of said motor through 180°, the condenser relationship is changed, starting a reverse motor movement and retraction of the friction arm to open said holding circuit, thereby avoiding motor overrunning and insuring that the X-ray tube is moved the exact distance desired.

10. Apparatus for taking stereo photofluorographic pictures comprising an X-ray tube, photofluorographic apparatus comprising a camera, a hood and a fluorescent screen, means including a chain connecting said X-ray tube and photofluorographic apparatus, means operating through a chain for moving said X-ray tube and photofluorographic apparatus up or down together in accordance with the elevation at which pictures are to be taken, a shaft, a crank on said shaft, a pulley rotatable on said crank and around which said chain passes, a motor for driving said shaft to move said X-ray tube from one stereoscopic position to another, whereby turning of the shaft 180°, when the crank is in extreme down or up position, moves the pulley up or down and effects an opposite movement of the X-ray tube of double the distance.

11. In apparatus for taking stereo photofluorographic pictures, base members, columns extending from said base members, an X-ray tube carriage supported by one of said columns, a photofluoroscopic carriage supported by other of said columns, a tie bar connecting the tops of said columns, a connecting line passing over pulleys adjacent the tops of said columns, along said tie bar, and with its ends respectively secured to said carriages to cause simultaneous movement thereof in the same direction longitudinally of said respective columns, driving mechanism mounted on said photofluoroscopic carriage and serving to simultaneously move the carriages up or down as desired, a housing mounted on the base member below said photofluoroscopic apparatus, a motor comprising a rotor with a shaft enclosed in said housing, said shaft carrying an electrical control cam and crank offset thereon, a pulley carried on said crank, the connecting line passing around said pulley, and switch means cooperating with said cam and enclosed in said housing for controlling said motor, so that a predetermined times its rotor and shaft turn, moving said pulley from extreme uppermost to extreme lowermost position and vice versa, thereby effecting a corresponding movement of the X-ray tube carriage with respect to the photofluoroscopic carriage of double the pulley movement.

12. Apparatus for taking stereo photofluorographic pictures comprising means for changing the relative positions of an associated X-ray tube and picture-taking equipment, a sequence timer for controlling the operation of said apparatus comprising a shaft, a motor for driving said shaft, a manual circuit closer for initiating a power circuit to said motor including a switch in its released position, a second switch, a first solenoid for when energized moving said switches and breaking said circuit, a second solenoid in a circuit with said closer and said second switch when moved upon energization of said first solenoid, a two-position switch controlled by said second solenoid and which in its released position is needed to complete the initial power circuit, and is moved to its other position upon energization of said second solenoid to break said circuit, establish a holding circuit through said second solenoid and circuit closer, thus preventing reestablishment of the power circuit to said motor, and the starting of a new sequence of operations until release and reactuation of said closer.

13. In apparatus for taking stereo photofluorographic pictures, means for changing the relative positions of an associated X-ray tube and picture-taking equipment, a sequence timer for controlling the operation of said apparatus comprising a motor, a manual circuit closer for initiating a power circuit to said motor including a switch in its released position, a second switch, a first solenoid for when energized moving said switches and breaking said circuit, a second solenoid in a circuit with said closer and said second switch when moved upon energization of said first solenoid, a two-position switch controlled by said second solenoid and which in its released position is needed to complete the initial power circuit, and is moved to its other position upon energization of said second solenoid, to prevent reestablishment of the initial actuating power circuit to said motor through said circuit closer, a cam turned by said motor, a control switch opened and closed by said cam, said cam switch when closed establishing a holding circuit for said motor, independent of said circuit closer and said first and two-position solenoid switches, and a holding circuit for supplying power to said X-ray tube independent of said circuit closer, but including said switches in released positions, and means effecting energization of said first solenoid after the taking of the first picture of a stereo sequence to thereby move the second switch, energize said second solenoid, move the two-position switch from its released position, and break the X-ray tube holding circuit, whereby the first picture of a stereo sequence is taken when said two-position switch is in released position without continuous use of the circuit closer, and the second picture of said sequence can be taken only when said switch is raised and the circuit closer used.

ROBERT L. GUENTNER.
ROBERT L. WRIGHT.

REFERENCES CITED

The following references are of record in the file of this patent:

UNITED STATES PATENTS

| Number | Name | Date |
| --- | --- | --- |
| 998,850 | Kelly | July 25, 1911 |
| 1,117,266 | Snook et al. | Nov. 17, 1914 |
| 1,901,526 | Mutscheller | Mar. 14, 1933 |
| 1,926,902 | Kelley | Sept. 12, 1933 |
| 2,331,225 | Powers | Oct. 5, 1943 |
| 2,433,129 | Land | Dec. 23, 1947 |